C. H. CASNER.
ROAD SCRAPER.
APPLICATION FILED FEB. 26, 1908.
939,664.
Patented Nov. 9, 1909.
2 SHEETS—SHEET 2.
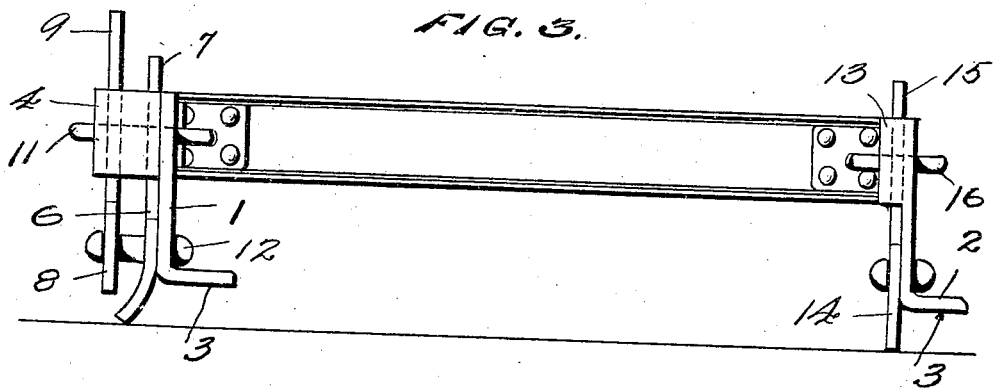
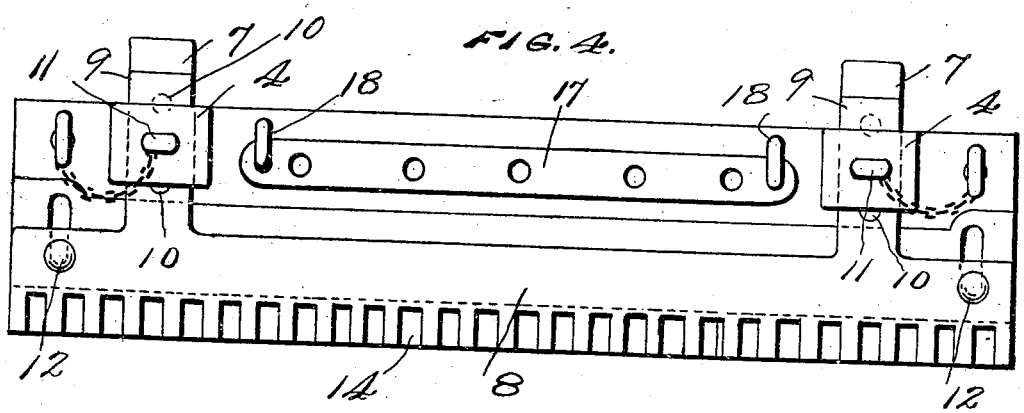
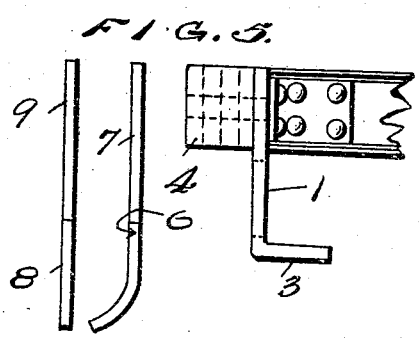
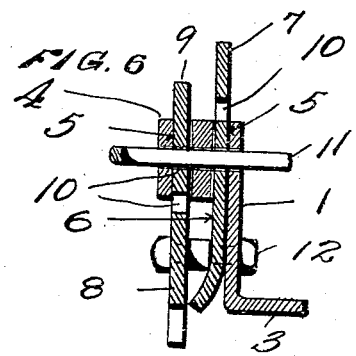
Witnesses.
Chas. K. Davies
Ella L. Corbett
Inventor
C. H. Casner
By Brock, Beekman Smith
Attorney

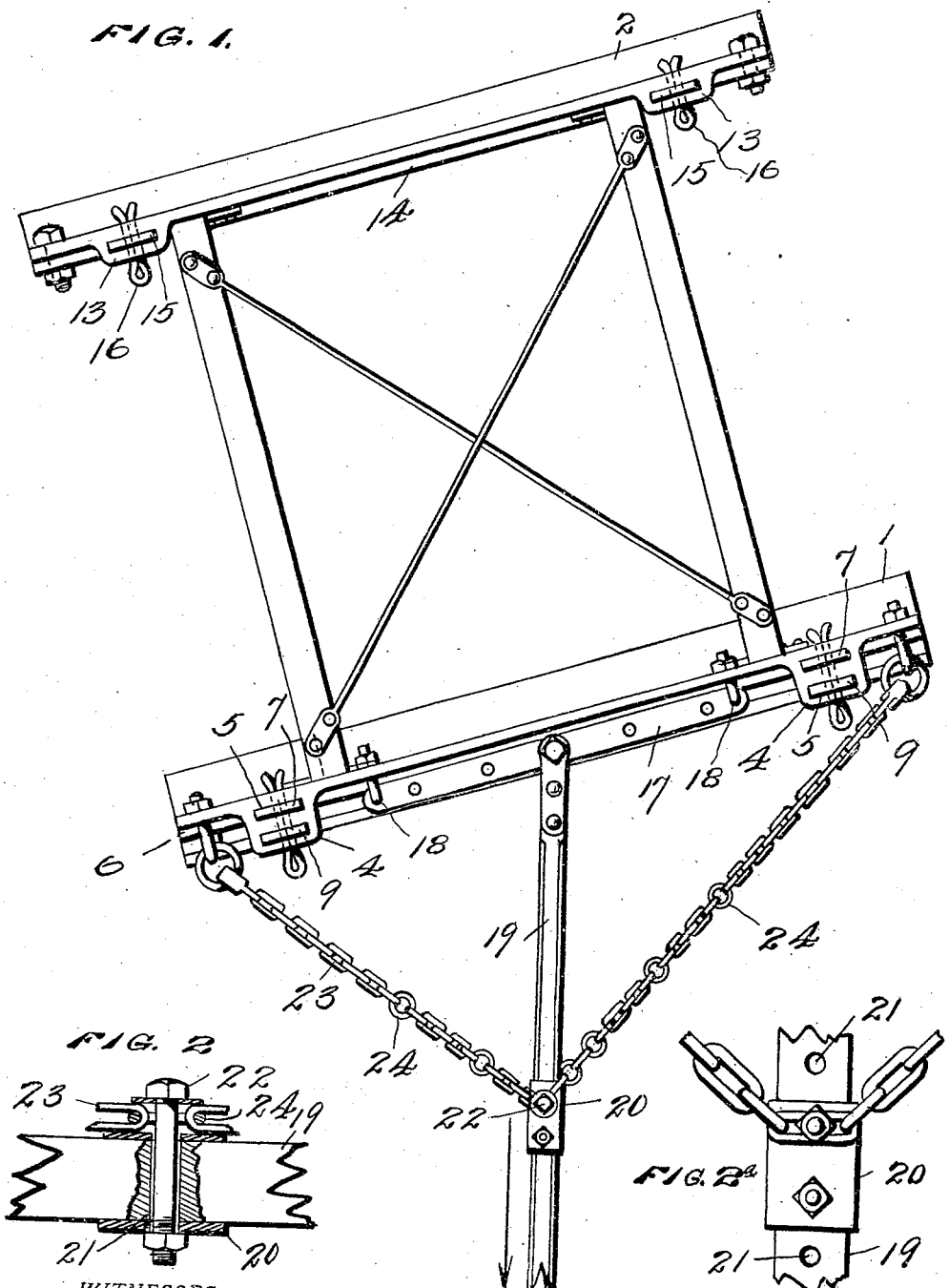

UNITED STATES PATENT OFFICE.

CYRUS H. CASNER, OF HEPBURNVILLE, PENNSYLVANIA.

ROAD-SCRAPER.

939,664.  Specification of Letters Patent.  Patented Nov. 9, 1909.

Application filed February 26, 1908. Serial No. 417,857.

*To all whom it may concern:*

Be it known that I, CYRUS H. CASNER, a citizen of the United States, residing at Hepburnville, in the county of Lycoming and State of Pennsylvania, have invented a new and useful Road-Scraper, of which the following is a specification.

My invention relates to road scrapers having a forward blade for removing a portion of the road surface and a rear blade for leveling.

The invention also provides a rake for removing stones, etc., and in an improved construction this rake is arranged adjacent to the forward blade and both are made adjustable so that either or both can be put in operative or inoperative position and also adjusted so as to produce different results when in operative position. The rear blade may also be thrown in or out of position and adjusted in a similar manner.

The invention further provides a new draft appliance by which the angle of the blades to the direction of movement may be regulated.

In the drawing: Figure 1 is a plan of a scraper embodying the invention. Fig. 2 is a detail view, partly in section, of the chain and bolt connection. Fig. 2ª is a detail plan view of the means for connecting the chain with the pole. Fig. 3 is a side view, the draft rigging being omitted. Fig. 4 is a front view with the pole and draft chain omitted. Fig. 5 is a detail view showing various parts disconnected. Fig. 6 is a sectional view through the front bar and one of the sockets showing the adjustment devices for the rake and scraper blades.

Reference numeral 1 designates the front bar and 2 the rear bar which may be formed of angle iron presenting flat faces 3 to the ground. These faces slide over the ground when the corresponding blades are in inoperative position and aid in leveling the road surface. The front bar carries two lugs 4 each of which is provided with two slots 5. The front scraper 6 rests against the front face of bar 1 and has arms 7 projecting upwardly through two of the slots 5. In front of the scraper blade 6 is mounted the rake 8 which has similar arms extending through the other slots. The arms 7 and 9 of the blade and rake are provided with holes 10, and each of the lugs 4 is provided with a hole through which cotter pins 11 are inserted. By this means the blade and rake may be adjusted in height and placed in operative and inoperative position, as desired. The lower parts of the blade and rake may be further guided and supported by studs 12. These are secured to the rake and pass through slots in blade 6 and in the bar 1. The studs are grooved to accommodate the bar and blade. This construction permits the blade and the rake to be moved independently in relation to the bar and at the same time spaces the blade and the rake apart.

The rear bar 2 is provided with sockets 13, each of which has a single slot. The rear blade 14 rests against the front face of the rear bar and has arms 15 extending through the slots in sockets 13. Arms 15 are perforated as has been described with reference to the arms 7 and 9, and the rear blade is held in adjusted position in a similar way by cotter pins 16.

The lower edge of front blade 6 is preferably curved forward, as shown, to form a suitable cutting edge to remove a portion of the road surface. When the implement is used to cut down the road, the rake is elevated and blade 6 is dropped below bar 1 a distance suitable for the work in hand. The rear blade 14 is not intended as a cutter but serves to level the surface and fill inequalities. It may be adjusted to any suitable height. Either the front or the rear blade may be made totally inoperative by raising it to the level of face 3 of the corresponding bar. This is frequently done when one of the blades is to be used by itself. The rake is used for removing sticks and stones without cutting down the road surface and for this purpose scraper blade 6 is elevated and the rake 8 dropped as shown in Fig. 6.

It is important to provide means for drawing the implement with the blades obliquely disposed to the direction of movement so as to throw material to one side of the road. This means will now be described: A perforated rail 17 is secured to the front bar by eyes 18. To any one of the perforations in this bar the pole 19 is secured by a bolt and nut. The pole is provided with a slider 20. A chain 23 is connected at each end to one end of the front bar and is connected at an intermediate point of its length to the slider by bolt 22. The slider is also provided with means for attaching a swingle-tree or other draft appliance. To facilitate connection of the chain with the bolt, certain of the links 24 may be made round. As shown in Fig. 1 the pole is connected with rail 17 and the chain in such a way as to give a certain angle of pull to the implement. This angle may be varied as desired by changing the connection of the pole with the rail and of the chain with the bolt. In another form of construction as shown in Fig. 2, the pole may be provided with a series of holes 21 and bolt 22 may be used not only to engage the chain but to pass through the holes and retain the slider fixed in position on the pole instead of loose thereon as shown in Fig. 1.

I claim:

1. In a scraper, the combination of a bar, a scraper blade and a rake carried by the bar and means by which the blade and rake may be independently adjusted.

2. In a scraper, the combination of a bar having a flat face presented to the road surface, lugs carried by the bar, a scraper blade having arms seated in sockets in the lugs, a rake having arms similarly seated, the arms being perforated and the pins passing through holes in the lugs and serving to hold the blade and rake in adjusted position.

3. The combination of a bar having a flat face presented to the road surface, lugs carried by the bar, a scraper blade having arms seated in sockets in the lugs, a rake having arms similarly seated, the arms being perforated, pins passing through holes in the lugs and serving to hold the blade and rake in adjusted position, and guiding devices intermediate the blade and the rake for supporting the lower portions of the last two.

4. In a scraper, the combination of a frame including a front and a rear bar, a cutting blade adjustably secured to the front bar and a smoothing blade adjustably secured to the rear bar.

5. In a scraper, a frame including a front bar and a rear bar, each having a flat face presented to the road surface, a cutting blade having a forwardly curved edge, adjustably secured to the front bar and a vertical smoothing blade adjustably secured to the rear bar.

6. In a scraper, a frame including a front bar and a rear bar each having a flat face presented to the road surface, a cutting blade having a forwardly curved edge, adjustably secured to the front bar, a vertical smoothing blade adjustably secured to the rear bar, and a rake adjustably secured to the front bar adjacent to the cutting blade.

7. In a scraper having a cutting blade and a smoothing blade, draft mechanism comprising a rail provided with a plurality of perforations, a pole adapted to be secured to the rail by means of the perforations and means for securely holding the pole at any desired angle to the axis of the implement.

8. In a scraper having a cutting blade and a smoothing blade, draft mechanism comprising a rail provided with a plurality of perforations, a pole adapted to be secured to the rail by means of the perforations, a chain secured at each end to the scraper, a slider carried by the pole, and means for securing the chain at an intermediate point to the slider.

CYRUS H. CASNER.

Witnesses:
J. C. HILL,
H. RUSSELL HILL.